(12) United States Patent
Miller et al.

(10) Patent No.: US 7,926,997 B1
(45) Date of Patent: Apr. 19, 2011

(54) DECORATIVE HYBRID FIBER OPTIC ATC DOWNLIGHT

(76) Inventors: Jack V. Miller, Seaford, DE (US); Ruth Ellen Miller, Seaford, DE (US)

( * ) Notice: Subject to any disclaimer, the term of this patent is extended or adjusted under 35 U.S.C. 154(b) by 0 days.

(21) Appl. No.: 12/833,419

(22) Filed: Jul. 9, 2010

(51) Int. Cl.
*E04D 13/00* (2006.01)
(52) U.S. Cl. ......... 362/576; 362/147; 362/580; 362/565
(58) Field of Classification Search .......... 362/147–150, 362/565, 364–365, 583, 264, 294, 296.01, 362/303, 345, 373, 576, 580, 554
See application file for complete search history.

(56) References Cited

U.S. PATENT DOCUMENTS

| | | | | |
|---|---|---|---|---|
| 2,716,185 | A * | 8/1955 | Burliuk et al. | 362/366 |
| 4,363,086 | A * | 12/1982 | Fletcher | 362/368 |
| 4,739,460 | A * | 4/1988 | Kelsall | 362/365 |
| 5,709,463 | A * | 1/1998 | Igram | 362/268 |
| 7,223,002 | B2 * | 5/2007 | Miller et al. | 362/551 |
| 2003/0223240 | A1 * | 12/2003 | Houle | 362/364 |
| 2004/0057251 | A1 * | 3/2004 | Isaacson et al. | 362/555 |
| 2005/0060949 | A1 * | 3/2005 | McNaught | 52/28 |
| 2007/0064433 | A1 * | 3/2007 | Wright | 362/364 |

* cited by examiner

*Primary Examiner* — Julie A Shallenberger

(57) ABSTRACT

A convection-cooled recessed downlight fixture for an airtight ceiling, having a reflector, (preferably bright aluminum) held in a hole in a ceiling with knock-outs bent down against the upper surface of the ceiling; a lamp housing (preferably black-anodized aluminum), removably attached to the upper end of the reflector, and a bezel assembly including a decorative trim element, is removably installed in the lower end of the reflector and held therein with screws removably engaging the reflector, whereby the bezel and decorative element may be removed from the fixture for re-lamping.

4 Claims, 5 Drawing Sheets

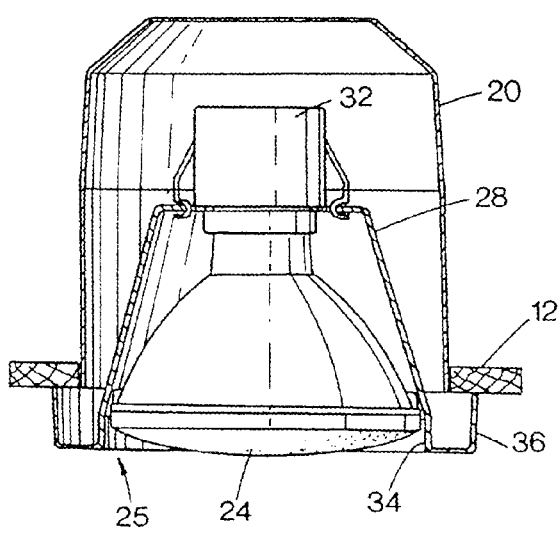
Fig. 1  6,116,750
FIGURE 2
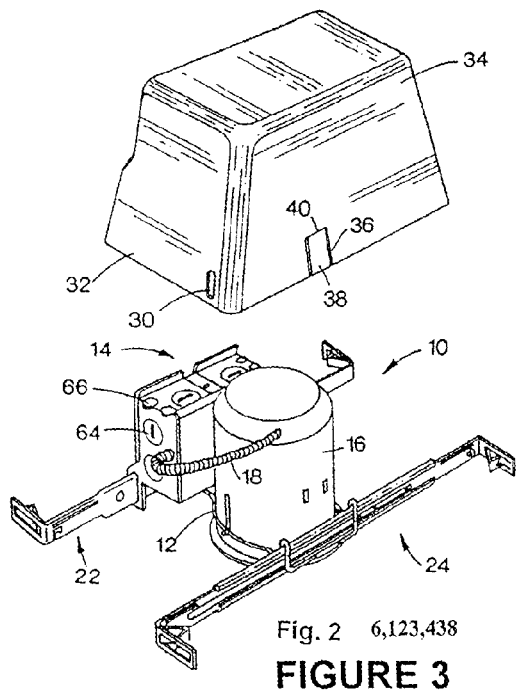
Fig. 2  6,123,438
FIGURE 3
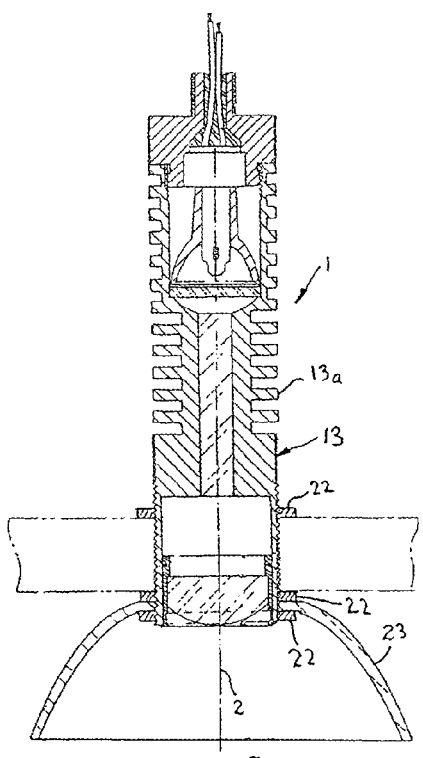
US 7,223,002 B2  FIGURE 5
FIGURE 4
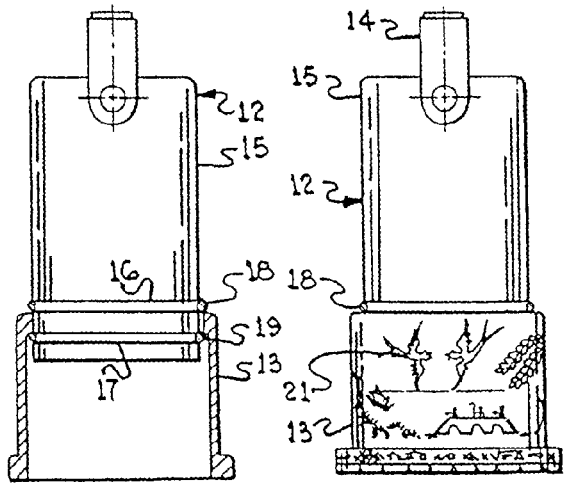
FIG. 11    FIG. 12
US 6,582,104
FIGURE 5

US 6,474,846

Des. 427,368 ic ATC downlight (1) according to the present invention,
wherein an optional decorative shade is a platter;

DECORATIVE HYBRID FIBER OPTIC ATC DOWNLIGHT

US PATENT REFERENCES CITED

U.S. Pat. No. 6,116,750—Hentz
U.S. Pat. No. 6,123,438—Hentz
U.S. Pat. No. 6,474,846—Kelmelis
Des. 427,368—Kelmelis
U.S. Pat. No. 5,099,399—Miller, et al
U.S. Pat. No. 6,582,104—MILLER, et al
U.S. Pat. No. 7,223,002—Miller, et al
application Ser. No. 12/832,640—Miller, et al

FIELD OF THE INVENTION

This invention applies to the field of decorative recessed downlights capable of being mounted in ATC (Air-Tight Ceiling), and more specifically to recessed downlights that emit no IR (infrared) energy into a room.

DESCRIPTION OF THE PRIOR ART

Most presently known recessed downlight fixtures normally use a tungsten/halogen in a reflector aimed in the nadir direction on an optical axis within a housing, usually having an open-bottom or a glass lens in the ceiling plane. An incandescent or tungsten/halogen lamp emits its IR "heat of light" of approximately 90% of its total energy. Therefore, the vast majority of energy emitted into the room during warm weather must be removed with HVAC (Heating, Ventilating and Air Conditioning) cooling. Thus a 100 watt incandescent lamp consumes 100 electrical watts and emits 90 Watts of heat into the room . . . and onto the electric bill. Then HVAC power is needed to pump the lamp heat back out of the room. This has been significantly reduced by the applicant's prior art fiber optic lighting systems of U.S. Pat. No. 5,099,399 that emit all their IR into a remote, non-air-conditioned space. Such systems have been independently certified as saving 50% to 70% of the electrical power in various installations.

PURPOSE AND ADVANTAGES OF THE PRESENT INVENTION

The primary object and advantage of the present invention is to provide an attractive, decorative downlight fixture in which the lamp heat is emitted into the plenum above the ceiling and only visible light with no IR is emitted through a thermal barrier bezel into the room below the ceiling.

THE SUMMARY OF THE INVENTION

The present invention is convection-cooled recessed downlight fixture for air-tight mounting in an insulated ceiling including: a reflector sealably mounted in an air-tight ceiling, a lamp and lamp housing assembly removably attached to the top of the reflector with radially-spaced fasteners, a thermal barrier bezel assembly closing the lower end of the reflector and being held therein with radially-spaced fasteners for removal and re-lamping from below the ceiling. The fixture has bottom and top vents, providing lamp cooling by convective air flow.

BRIEF DESCRIPTION OF THE DRAWINGS

FIG. 2 is a cross-sectional view of an prior art ATC (air tight ceiling) downlight fixture of U.S. Pat. No. 6,116,750 having a sealed, insulating plenum enclosure.

FIG. 3 is a perspective view of another prior art ATC downlight fixture of U.S. Pat. No. 6,123,438 in a sealed, insulated plenum enclosure;

FIG. 4 is a cross-sectional view an applicants' prior art decorative lighting fixture of FIG. 5 of U.S. Pat. No. 7,223, 002.

FIG. 5 is a cross-sectional view of the applicants' prior art decorative lighting fixture of FIGS. 11 and 12 of U.S. Pat. No. 6,582,104;

DETAILED DESCRIPTION OF THE DRAWINGS

Figure 1:
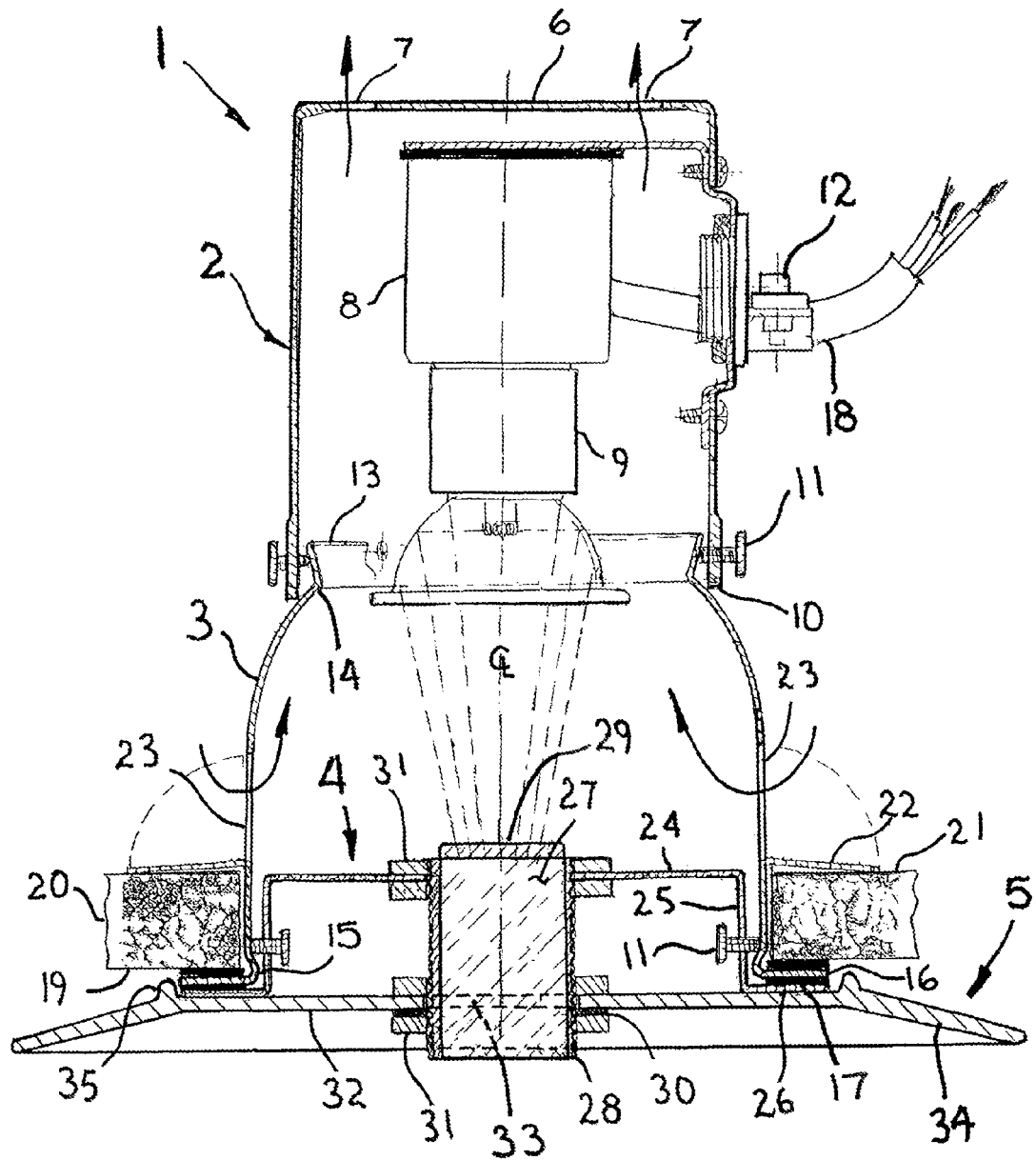
FIG. 1 is a cross-sectional view of a first preferred hybrid fiber optic ATC downlight according to the present invention, wherein an optional decorative shade is a platter.

In FIG. 1 a cross-sectional view of a first preferred hybrid fiber optic ATC downlight (1) according to the present invention is shown with the decorative shade as a platter (34). The downlight (1) consists of four assemblies: a lamp housing assy (assembly) (2); a reflector assy (3); a bezel assy (4); and an optional decorative shade (5). A generally cylindrical lamp housing (6) is shown having an upper end with exhaust vents (7) therethrough, a lampholder (8), on an optical axis (CL) and electrically connected with insulated wires (16) through a conduit connector (12) to a power source (not shown). Lamp (9) is shown as a reflector lamp, but may be another lamp compatible with lampholder (8). The lamp housing assy (2) has an open lower end (10) with radially-spaced fasteners (11) shown as thumb screws.

A reflector assy (3) terminates at its proximal (upper) end (13) in an exterior groove (14) that receives fasteners (11) of lamp housing assy (2). The distal (lower) end (15) of reflector (3) has an exterior radial flange (16) with a foam sealing gasket (17). A number of knock-outs (22) are bent out of cooling air openings (23) against the upper surface (21) of ceiling (20), securing reflector (3) to ceiling (20) and allowing cooling air to convect upwards to the exhaust vent (7).

A bezel assembly (4) includes a hat-shaped metal closure (24), holding a light-transmitting, heat-absorbing hybrid fiber optic element (27) thermally-bonded into an externally-threaded housing (28). Fiber optic element (27) has a proximal, optically-bonded "hot mirror" (29), that transmits visible light and reflects IR back to the lamp. The bezel assembly is secured into the distal end of reflector (3) with radially-spaced fasteners (11) shown as thumb screws, in circular wall (25) and engaged against an internal ridge formed into the distal end flange (16) of reflector (3). In order to facilitate sealing, a first foam gasket (17) is adhered to the reflector flange (14) and a second foam gasket (17) is adhered to bezel flange (26).

Figure 11:
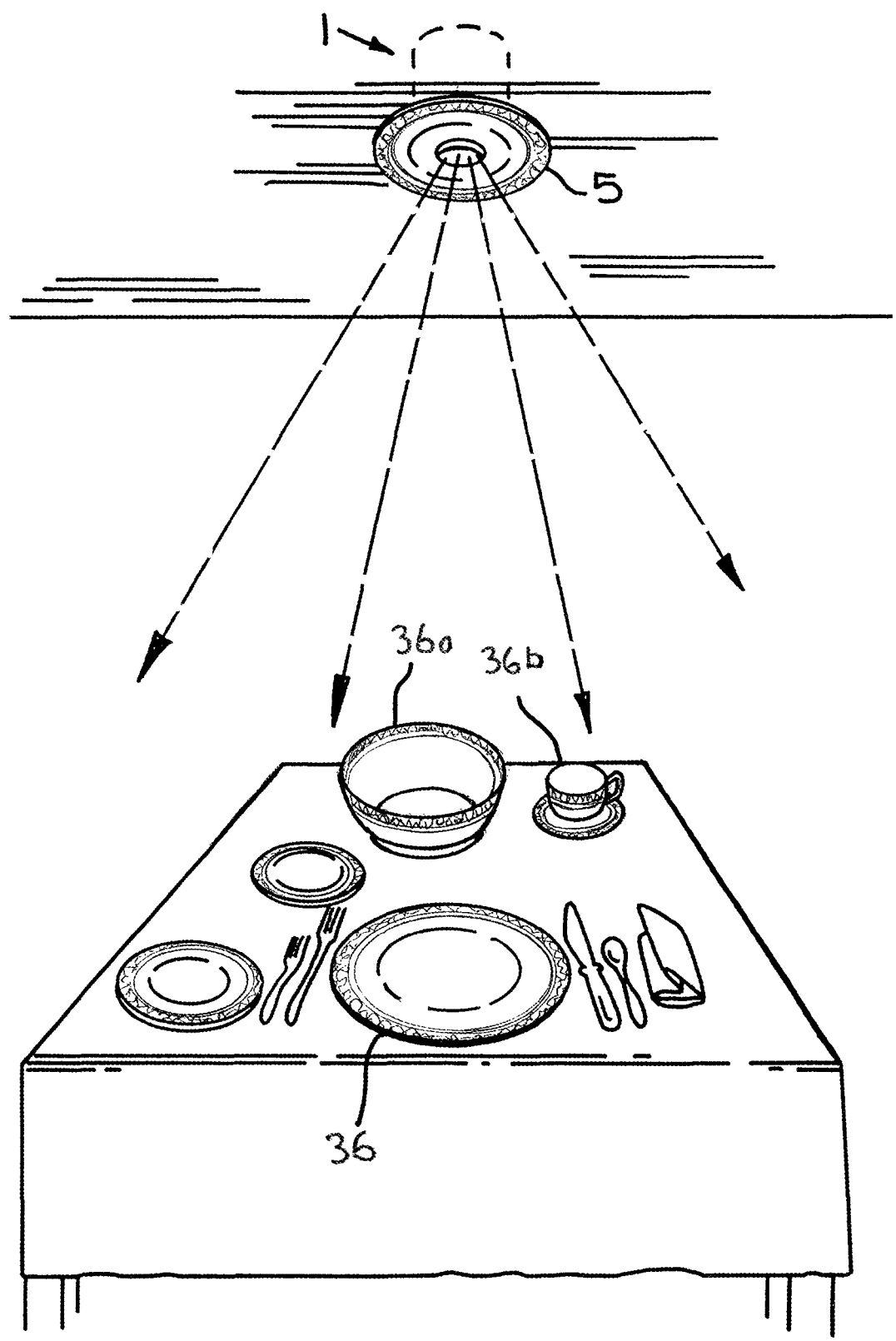
FIG. 11 is perspective view of a first preferred hybrid fiber optic ATC downlight according to the present invention, wherein the fixture shade is a platter (5) shown matching decorative table dinnerware.

A decorative trim assembly (5) is shown as a first preferred embodiment in the shape of a porcelain dinner plate having a substantially-flat central portion (32), a shallow-angled rim portion (34) and a generally-circular upstanding rib (35). The plate may be made from a commercially-available dinner plate (36 of FIG. 11) which has a core-drilled mounting hole (33) to fit over the diameter of the fiber optic housing (28).

The foregoing detailed description of FIG. 1 of the present invention has been presented as a basis for comparison to the cited prior art recessed light fixtures. This invention comprises a decorative recessed downlight for mounting in an insulated ATC (Air-Tight Ceiling) that emits no IR (infrared) energy into a room. The above description and drawing provides a clear basis for comparison of the present invention to the cited prior-art references discussed below.

In FIG. 2, the cross-sectional view of an prior-art air-tight-ceiling downlight fixture of U.S. Pat. No. 6,116,750 is shown, having a lamp housing (28) and having an insulating enclosure (20) above a ceiling (12) with the heat-of-light from a lamp (24) almost entirely emitted into the room but with a portion of said heat-of-light being conducted and radiated above the ceiling plane. Thus, an ATC ("air-tight ceiling") light fixture is really not "air tight", but is defined as passing no more than 2 CFM (cubic feet per minute) of air through the light fixture at a differential pressure of 1.2 Lb/cf (pounds per cubic foot). In this typical ATC light fixture, the air-tight sealed ceiling (12) actually extends from the planar ceiling as shown, and extends up into the fixture enclosure (20) so the light fixture housing becomes a part of the (thermal) ceiling. Then the unsealed PAR (Parabolic Reflector) lamp serves as a lens, reflecting much of the lamp heat into the room. This may conserve some energy in winter, but requires far more HVAC (Heating, Ventilating and Air Conditioning) cooling in the summer.

FIG. 3 is a perspective view of U.S. Pat. No. 6,123,438, which has a lamp housing similar to the '750 patent of FIG. 2, but in addition has an insulating housing (34) to reduce heat transfer into the plenum and emit virtually al lamp heat into the room. This fixture is thus the antithesis of the present invention.

FIG. 4 is a cross-sectional view of the applicants' prior art decorative lighting fixture of (FIG. 5) of U.S. Pat. No. 7,223,002. The '002 fixture is recessed, but its primary patented feature is the use of a lens to collimate the light from a hybrid optical fiber. Further, it lacks the bezel screws (11) that are loosened to re-lamp from below, within the room.

FIG. 5 is a cross-sectional view of the applicants' prior art decorative lighting fixture (FIG. 11) of U.S. Pat. No. 6,582,104, along with an exterior side elevation view showing a decorative pattern. The primary patented feature of the '104 fixture is the retention of the decorative shade by securing it between two O-rings. Further, it is not a recessed fixture, but instead is surface mounted, whereby all the heat of light is emitted into the room, the antithesis of the present invention.

Figure 6:
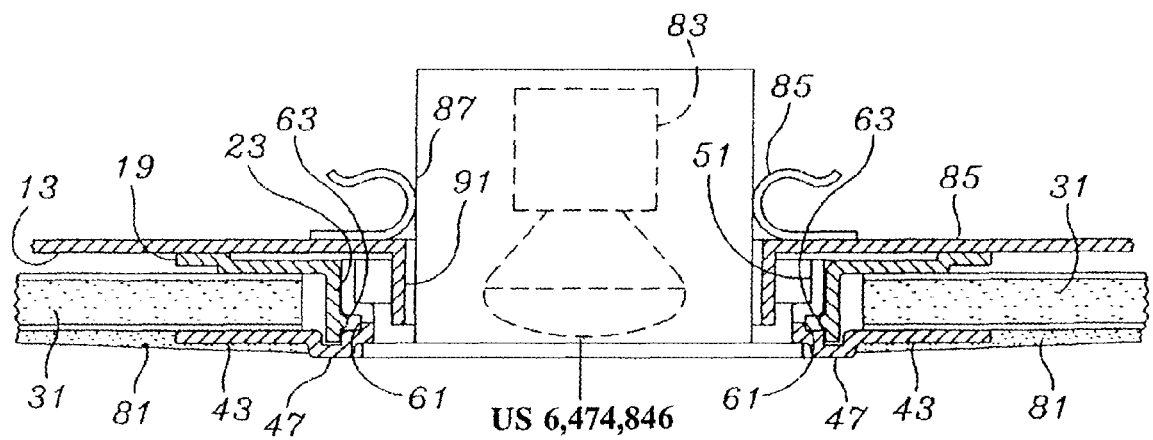
FIG. 6 is a cross-sectional view of a prior art decorative trim recessed fixture of U.S. Pat. No. 6,474,846.

FIG. 6 shows a similar cross-sectional view of the prior-art U.S. Pat. No. 6,474,846 showing the same air-tight-ceiling downlight fixture of U.S. Pat. No. 6,116,750, in which lamp (83) in housing (87) causes the heat-of-light from a lamp (83) almost entirely emitted into the room but with a portion of said heat-of-light being conducted and radiated above the ceiling plane. This fixture is again the functional and structural antithesis of the present invention. However, it does have a trim ring (23,43) shown below.

Figure 7:
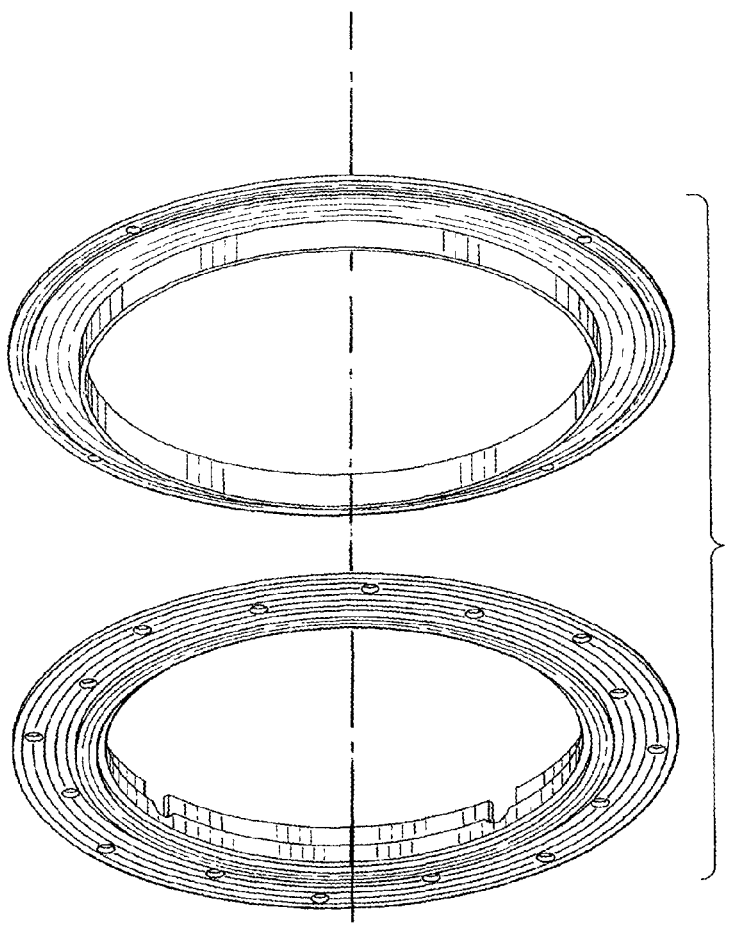
FIG. 7 shows perspective views of a prior art trim Design Pat. Des. 427,368, elements (23,43) also U.S. Pat. No. 6,474, 846, both filed patents on the same day by the same inventor.
Figure 8:
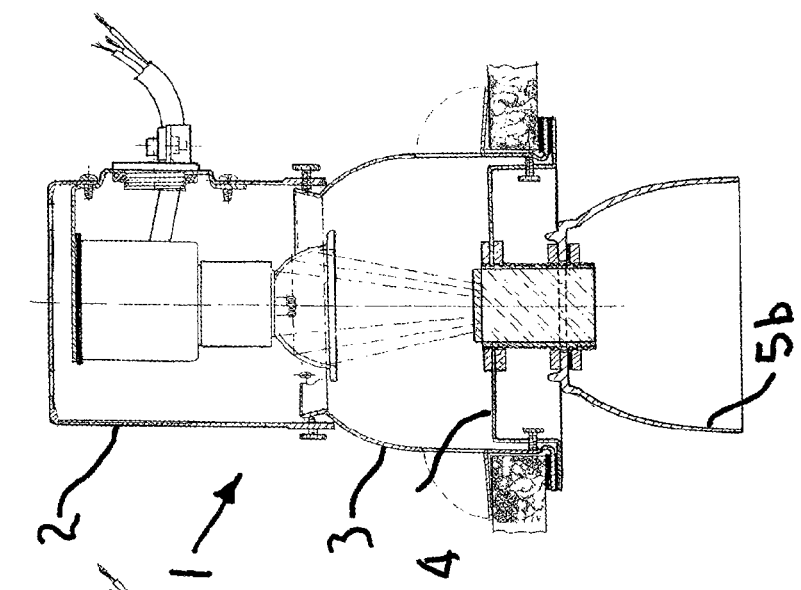
FIG. 8 is a cross-sectional view of a first preferred hybrid fiber optic ATC downlight according to the present invention, wherein the decorative shade is an optional platter (5) as shown in the above FIG. 1.
Figure 9:
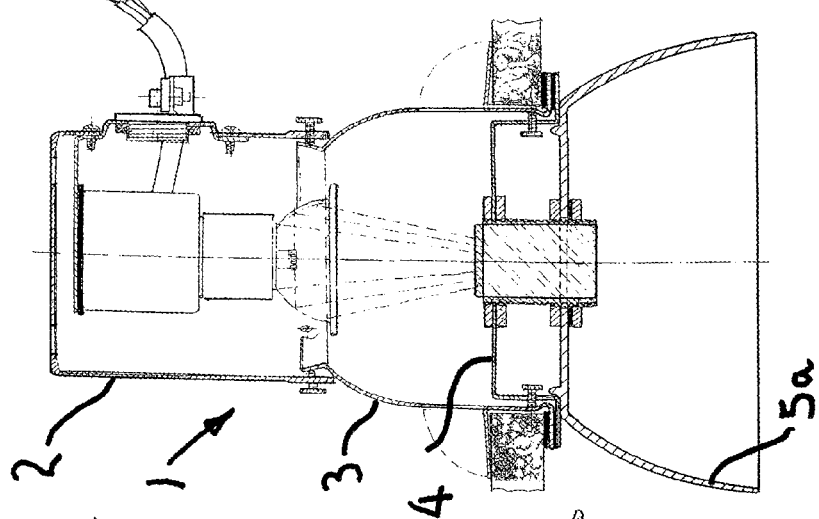
FIG. 9 is a cross-sectional view of a first preferred hybrid fiber optic ATC downlight according to the present invention, wherein the decorative shade is an optional bowl (5*a*) in the above FIG. 1.
Figure 10:
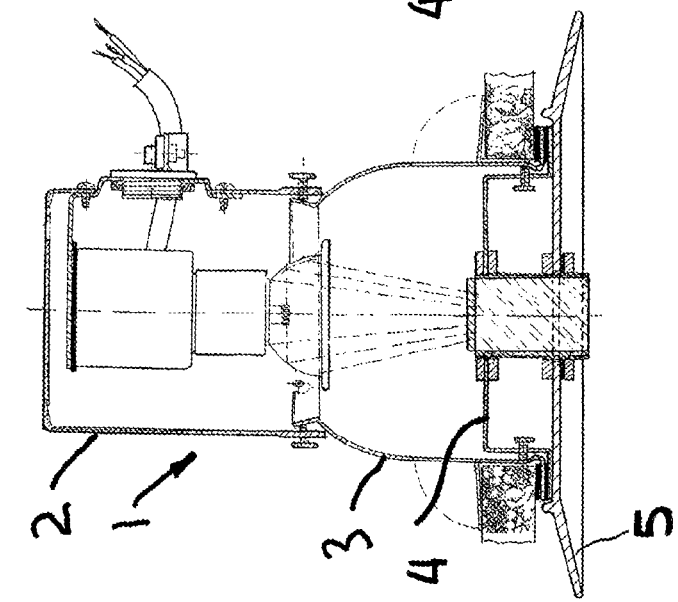
FIG. 10 is a cross-sectional view of a first preferred hybrid fiber optic ATC downlight according to the present invention, wherein the decorative shade is an optional cup (5*b*) in the above FIG. 1.

FIG. 7 is a perspective view of the design Pat. Des. 427,368, showing the structure and decorative features of trim ring elements (23,43) of the above U.S. Pat. No. 6,474,846.

The invention claimed is:

1. A decorative, recessed downlight (1) including a cylindrical lamp assembly (2) on an optical axis (CL) having an upper end (6), wherein said upper end includes air exhaust vents (7), a lampholder (8) connected to a remote source of power and a lamp (9) disposed on said optical axis, said lamp assembly (2) having an open lower end (10);

a reflector (3) disposed on said optical axis (CL) terminating at an upper end (13), wherein the upper end of the reflector engages with said lower end of said lamp assembly (2), and said reflector having a lower end (15) with an exterior radial flange (16) that abuts a lower surface (19) of a ceiling (20), said reflector (3) having knock-outs (22) bendable downward against an upper surface (23) of said ceiling (20) and wherein the knock-outs form convection air inlets (24) therethrough;

a hat-shaped bezel (4) closing the lower end (16) of said reflector (3), said bezel having a top surface (24) extending above said ceiling (20), a circular wall (25) passing through said ceiling (20), and terminating at a lower end that includes a radial flange (26), wherein said radial flange of said bezel abuts the lower side of said reflector flange (16), and wherein said bezel supports an externally-threaded fiber optic housing (28), wherein a hybrid fiber-optic element (27) is thermally bonded into said fiber optic housing (28) and wherein said hybrid fiber optic element depends through said ceiling on said optical axis (CL); and a first decorative shade (5) in the form of a dinner platter having an upstanding circular rib (35) disposed outside of said radial flange of said bezel and wherein a second threaded nut (31) retains said first decorative shade on said fiber optic housing (28).

2. A decorative, recessed downlight according to claim 1 in which said decorative shade (5) is selected from a group including dinnerware platters (5), bowls (5a), and cups (5b).

3. A decorative, recessed downlight according to claim 1 in which said decorative shade (5) is selected from a group of porcelain dinnerware platters (5), bowls (5a), and cups (5b).

4. A decorative, recessed downlight according to claim 1 in which said decorative shade (5) is selected from a group of commercially-available porcelain platters (5), bowls (5a), and cups (5b) in which a central hole (33) for a hybrid fiber optic housing (28) is produced by a cutting process selected from a diamond or tungsten-carbide core drilling, laser cutting, or water-jet cutting.

* * * * *